March 18, 1930.  B. J. ALISON  1,751,020

SHARPENING DEVICE FOR LAWN MOWERS

Filed July 20, 1928

INVENTOR
*Brisbane J. Alison.*
BY
*Gerald F. Baldwin*
ATTORNEY

Patented Mar. 18, 1930

1,751,020

UNITED STATES PATENT OFFICE

BRISBANE J. ALISON, OF DETROIT, MICHIGAN

SHARPENING DEVICE FOR LAWN MOWERS

Application filed July 20, 1928. Serial No. 294,136.

This invention relates to improvements in sharpening devices for lawn mowers, and particularly to light portable devices that may be easily carried from place to place.

Among other things the invention aims to provide a sharpener: with which blades of a lawn mower may be uniformly sharpened throughout their entire length so that no high or low spots are likely to result; with which all the blades may be so sharpened that each projects the same distance from the shaft on which they rotate; in which means are provided for varying the angle of the cutting edge of the blades; and into and from which the sharpening means can be quickly inserted and removed.

With these and other objects in view which will become apparent as the specification proceeds, the invention consists in certain novel construction and combination of parts hereinafter more fully described with the aid of the accompanying drawings, in which.

Figure 1:
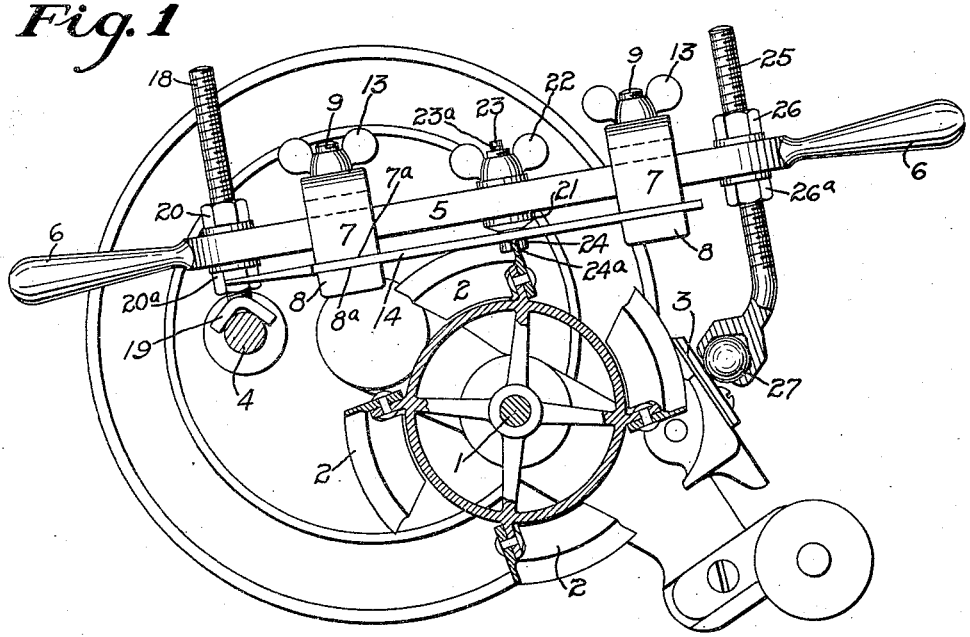
Figure 1 illustrates a side view of the invention in position on a lawn mower, the latter being partly shown in section.
Figure 2:
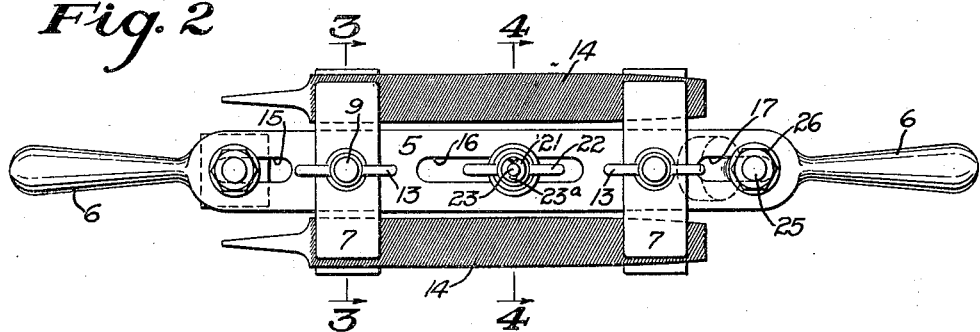
Figure 2 is a plan view of the device.
Figure 3:
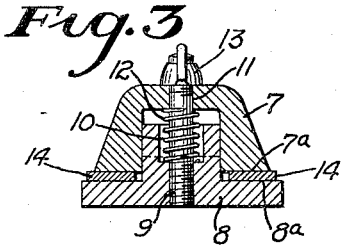
Figure 4:
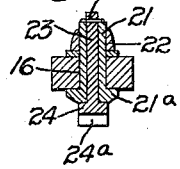

Figures 3 and 4 are sections on the lines 3—3 and 4—4 of Figure 1.

Referring to the drawings, 1 designates the shaft of a conventional lawn mower having a plurality of usual concentric spiral blades 2 thereon; 3 indicates the cutting plate in close proximity to one margin of which each blade in turn passes, and 4 is a transverse rod provided in virtually all makes of lawn mowers.

The device consists of a frame 5 having handles 6 at its ends. 7 and 8 are upper and lower clamping members. A stud 9 extends upwardly from each lower clamping member 8 through an aperture 10 in the frame and through an opening 11 in its upper clamping member 7. A helical spring 12 is provided around each stud 9 intermediately of its length which has one end bearing against each of its members 7 and 8 so that when a nut 13 on the upper end of the stud is loosened the said members are forced apart. On each side of the frame 5 between bearing surfaces 7$^a$ and 8$^a$ of the clamping members 7 and 8 sharpening members 14 are held. In the accompanying drawings ordinary files are shown employed for this purpose, but obviously any sharpening members having file-like cutting surfaces may be utilized since the file tangs are not used.

15, 16 and 17 designate three elongated vertical slots through the frame 5. Through the slot 15 a threaded pin 18 extends which has a downturned V-block 19 on its lower end. 20 and 20$^a$ designate nuts in threaded engagement with the pin above and below the frame 5, so that the distance of the V-block below the frame may be set as desired. Through the central slot 16 a sleeve 21 extends which has a flange 21$^a$ that bears against the underside of the frame 5 and a nut 22 on its upper end by which it is held in position. Through the sleeve 21 a spindle 23 is rotatably arranged on the lower end of which latter is a disc 24 having a horizontal slit 24$^a$ in its underside. Through the upper end of the spindle 23 a pin 23$^a$ is provided to prevent the said spindle from falling through the sleeve, though other means for accomplishing this purpose may be utilized. Through the third slot 17 a threaded arm 25 extends. Nuts 26 and 26$^a$, one above and one below the frame 5, in threaded engagement with the arm permit vertical adjustment of the latter. On the lower end of the arm a guide such as the ball 27 is provided.

The longitudinal and vertical adjustment of the V-block 19 with respect to the frame 5 allow it to be so set that it may engage the brace rod 4 of almost any make or type of lawn mower, and the block being V-shaped permits it being used on various sizes of rods. The longitudinal and vertical adjustment of the threaded arm 25 permits the ball guide 27 being so set that the latter will rest on the cutting plate 3 of almost any machine. The adjustment permitted by the threaded arm 25 may also be employed to regulate the angularity of the sharpening members 14 relative to the blade 2 being sharpened. The longitudinal adjustment provided for the sleeve 21 and its spindle 23 permit the disc being so positioned relative to the V-block 19 and ball guide 27 that the slit 24$^a$ will engage the margin of the blade to be sharpened. By moving the sleeve 21 longitudinally in its slot 16 the cutting angle at which the blade is sharpened may also be varied, as the position of the disc 24 is then moved relative to the axis about which the blades 2 turn.

By moving the device transversely of the lawn mower with the V-block 19 sliding along the rod 4, the ball guide 27 along the cutting plate 3, and the slit 24ª in engagement with the margin of the blade being sharpened, the latter is gradually turned by the disc 24 so that the portion of the blade being sharpened is immediately under the sharpening members 14. Moreover the ball guide 27 prevents any one blade being sharpened to such an extent that its radius is reduced materially below that of the other blades. Again owing to the width of bearing surface of the two sharpening members 14 the danger of high and low spots developing in the blades as they are sharpened is reduced to a minimum.

While in the foregoing the preferred embodiment of the invention has been described and shown, it is understood that the construction is subject to such modifications and alterations as fall within the scope of the appended claims.

What I claim as my invention and desire to secure by Letters Patent is:

1. In a device of the character described, the combination of a frame having sharpening means attached to its underside adapted to be moved transversely of and to bear against a lawn mower blade, a block depending from said frame adapted to be moved with the latter along the transverse rod of the lawn mower, and means depending from said frame and rotatable about a substantially vertical axis adapted to hold that portion of the blade against which the sharpening means is then bearing in the desired position under the latter.

2. In a device of the character described, the combination of a frame having sharpening means attached to its underside adapted to be moved transversely of and to bear against a lawn mower blade, a block depending from said frame towards one of its extremities adapted to be moved with said frame along the transverse rod of the lawn mower, means depending from said frame and rotatable about a substantially vertical axis adapted to hold that portion of the blade against which the sharpening means are then bearing in the desired position under the latter, and means mounted on said frame adjacent its end remote from said block for varying the angle at which that portion of the blade is held against which the sharpening means bear.

3. In a device of the character described, the combination of a frame having sharpening means attached to its underside adapted to be moved transversely of and to bear against a lawn mower blade, a block depending from said frame adapted to be moved with the latter along the transverse rod of the lawn mower, means depending from said frame and rotatable on the latter adapted to hold that portion of the blade against which the sharpening means are then bearing in the desired position under the latter, and means permitting variation of the distance between the block and the rotatable means for holding the blade in position.

4. In a device of the character described, the combination of a frame, sharpening means held thereunder adapted to be moved transversely of and to bear against a lawn mower blade, a V-block depending from said frame adapted to be moved with the latter transversely along the transverse rod of the lawn mower, said V-block being adjustable at right angles to said frame, a spindle extending through said frame and held against axial movement, said spindle having a slit in its underside adapted to engage the blade to be sharpened and hold that portion of the latter against which the sharpening means are bearing in the desired position, and means permitting variation of the distance between the V-block and the spindle.

5. In a device of the character described, the combination of a frame, sharpening members held under said frame adapted to be moved transversely of and to bear against a lawn mower blade, a V-block depending from said frame adapted to be moved with the latter transversely along the transverse rod of the lawn mower, said V-block being adjustable both longitudinally and at right angles to said frame, a sleeve extending through said frame adjustable longitudinally of the latter, and a spindle extending through said sleeve held against axial movement, said spindle having a slit in its underside adapted to engage the blade and hold that portion of the latter against which the sharpening members are bearing in the desired position.

6. In a device of the character described, the combination of a frame, sharpening members held under said frame adapted to be moved transversely of and to bear against a lawn mower blade, a V-block depending from said frame adapted to be moved with the latter along the transverse rod of the lawn mower, a sleeve extending through said frame, a spindle through said sleeve and rotatable therein having a slit in its underside adapted to engage the blade being sharpened and hold that portion of the latter against which the sharpening means are bearing in the desired position, and an adjustable guide adapted to bear on the cutting plate of the lawn mower.

7. In a device of the character described, the combination of a frame, a block depending therefrom adapted to be moved longitudinally on a transverse rod of a lawn mower, clamping members extending laterally from said frame on both sides thereof, sharpening members supported by said clamping members one on each side of said frame and substantially parallel therewith, and a guide projecting under said frame between said sharpening members having a slot in its underside adapted to engage the margin of a lawn mower blade and to turn the latter relative to said sharpening members as the frame is moved longitudinally of the blade.

8. In a device of the character described, the combination of a frame, a block depending therefrom adapted to be moved longitudinally on a lawn mower tie rod, clamping members integral with said frame extending laterally on both sides thereof, sharpening members supported by said clamping members, one on each side of said frame and substantially parallel therewith, upper clamping plates on said sharpening members, means for holding said upper clamping plates in position, and a guide rotatable in said frame between said sharpening members having a slot in its underside to engage the margin of a lawn mower blade and turn it into sharpening position relative to said sharpening members, said sharpening members operating with their length substantially at right angles to the length of the blade surfaces being sharpened.

BRISBANE J. ALISON.